No. 836,533. PATENTED NOV. 20, 1906.
E. T. POLLARD.
STONE SAWING MACHINE.
APPLICATION FILED MAR. 19, 1906.
2 SHEETS—SHEET 2.
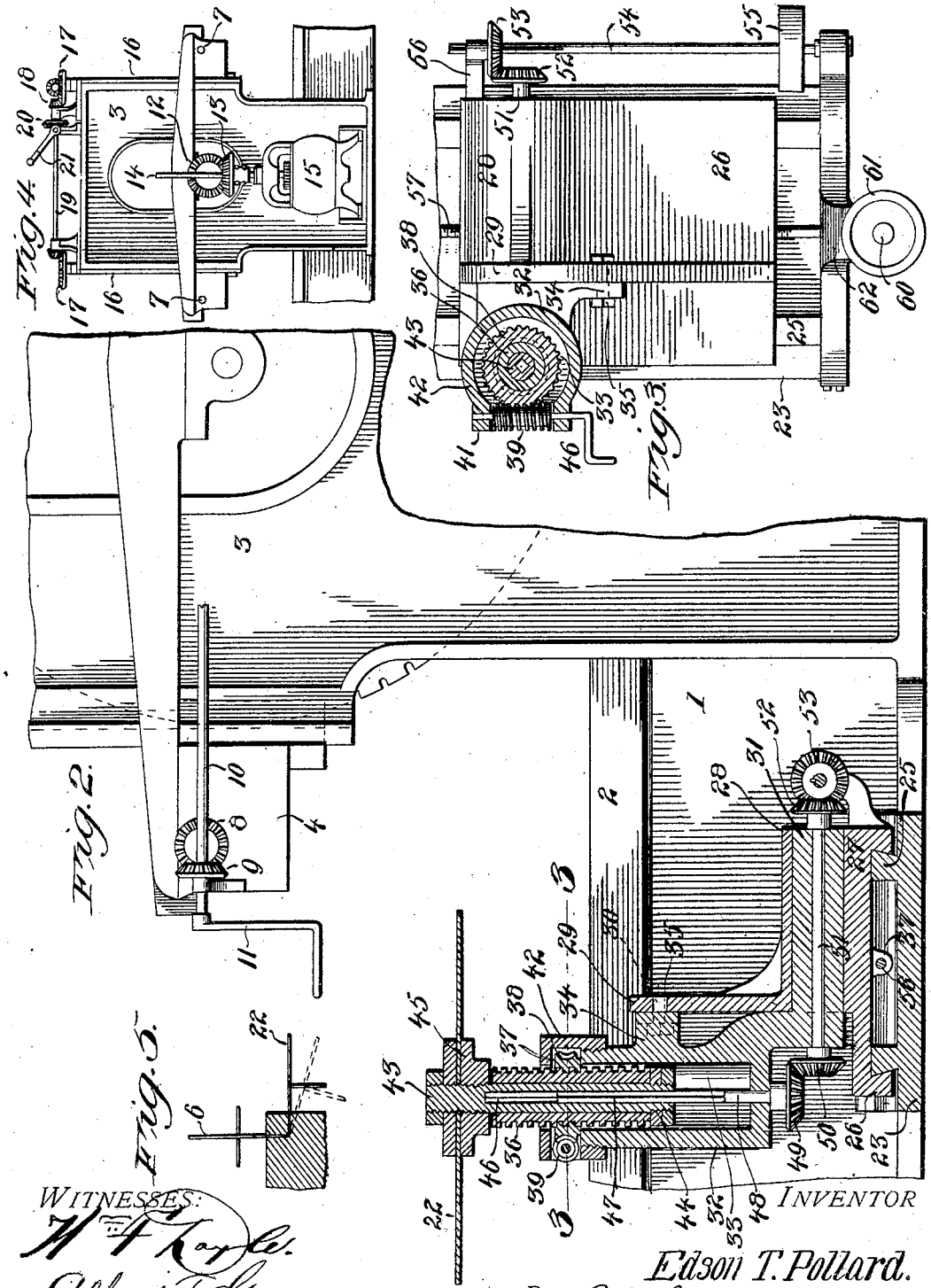
WITNESSES:
INVENTOR
Edson T. Pollard.
BY
Attorney

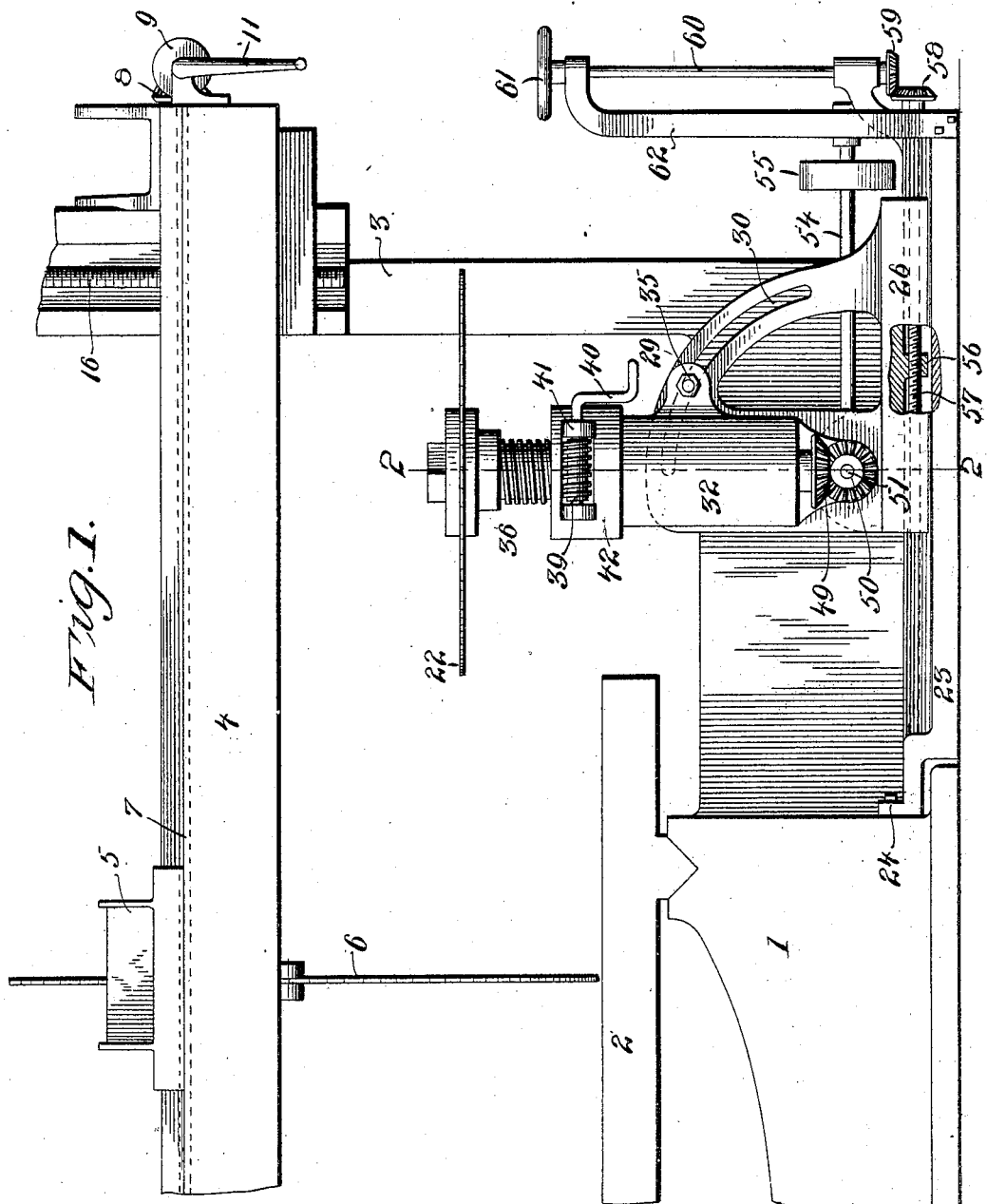

UNITED STATES PATENT OFFICE.

EDSON T. POLLARD, OF RUTLAND, VERMONT, ASSIGNOR TO F. R. PATCH MANUFACTURING COMPANY, OF RUTLAND, VERMONT.

STONE-SAWING MACHINE.

No. 836,533.        Specification of Letters Patent.        Patented Nov. 20, 1906.

Application filed March 19, 1906. Serial No. 306,903.

*To all whom it may concern:*

Be it known that I, EDSON T. POLLARD, a citizen of the United States, residing at Rutland, in the county of Rutland, State of Vermont, have invented certain new and useful Improvements in Stone-Sawing Machines, of which the following is a specification, reference being had therein to the accompanying drawings.

This invention relates to a stone-sawing machine, and particularly to a secondary saw disposed in substantially a horizontal plane and adapted to coöperate with the vertically-disposed saw, so as to completely remove the portion of the block to be sawed.

The invention has for an object to provide a saw disposed upon a horizontally-traveling carriage upon one side of the platen of a stone-working machine, together with means for adjusting the saw and its carriage toward and away from said platen.

A further object of the invention is to provide means for vertically adjusting said saw and driving the same in any of its adjusted positions.

Another object of the invention is to provide means for adjusting this saw at an inclination to a horizontal plane, so as to remove the portion of the material with a diagonally-disposed face thereon.

Other and further objects and advantages of the invention will be hereinafter set forth and the novel features thereof defined by the appended claims.

In the drawings, Figure 1 is an end view showing the saw applied to the frame of a stone-sawing machine. Fig. 2 is a side view thereof with parts of the side saw in section on line 2 2, Fig. 1. Fig. 3 is a horizontal section on line 3 3, Fig. 2. Fig. 4 is a side view of the tool-holder of a stone-sawing machine, showing the means for vertically adjusting the same; and Fig. 5 is a diagrammatic view indicating the cut or check adapted to be made by the use of the two saws.

Like numerals of reference indicate like parts throughout the several views of the drawings.

The construction of side saw herein shown is adapted to coöperate with the work-carrying platen of any character of stone-dressing machinery; but for the purpose of illustration one of the most applicable forms thereof is herein shown and described in connection with a stone-sawing machine having a vertically-disposed saw of the usual type.

In the form of stone-sawing machine shown the numeral 1 indicates the base thereof, upon which the platen 2 is slidably mounted in the usual manner to carry the work, while extending from the base at each the usual saw-holder, comprising opposite side is standards 3. These standards are connected together by cross-bars 4, upon which the arms 5, carrying the vertically-disposed saw 6, are mounted and adapted to travel. This saw 6 is constructed for adjustment laterally of the platen by means of the screws 7, engaging the saw-carriers 5, as indicated by dotted lines in Fig. 1, and provided at one end with the bevel-gear 8, meshing with a corresponding gear 9, carried upon the shaft 10, which is provided with any suitable crank 11 for adjusting the screws 7 upon each side of the standard simultaneously.

The arbor or shaft of the saw 6 is provided with a driving-pinion 12, as shown in Fig. 4, and meshing with a coöperating pinion 13, slidingly splined upon the shaft 14 of the driving-motor 15, disposed in fixed position. The cross-bars 4, which support the saw-carriers, are adjusted vertically of the standards by means of screws 16 at opposite sides thereof, provided at their upper ends with bevel-gears 17, meshing with coöperating pinions 18, carried by a shaft 19 and adapted to be operated by a driving-pinion 20, coöperating with a gear carried upon the adjusting-lever 21.

By the means hereinbefore described the vertically-disposed saw may be adjusted laterally of the platen and also vertically toward and from the same and driven in any of its adjusted positions.

The side or checking saw 22 is mounted upon a base-plate 23, adapted for attachment to the side of the base 1 in any desired manner—for instance, by means of bolts 24. This plate 23 is provided with dovetailed ribs 25, adapted to be engaged between similar ribs 26, depending from the carriage 27. This carriage is provided with an elongated bearing box or sleeve 28 upon its upper surface, from which an upwardly-extended rib or flange 29 is disposed and provided with a segmental adjusting-slot 30. Disposed in this bearing 28 is the shaft or axis 31 of the saw-carrier 32, which is disposed at substantially a right angle thereto, as shown in Fig. 2. This carrier is formed with an interior chamber 33, adapted to receive the means for vertically adjusting the saw, and with a lug or projection 34, extending into contact with the flange 29 and adapted to be secured thereto in its adjusted position by means of the bolt 35 or other suitable securing means.

The saw may be vertically adjusted in its carrier by any desired means—for instance, the threaded screw 36, mounted in the interiorly-threaded nut 37, having upon its outer periphery a worm-gear 38, adapted to engage the driving-worm 39, provided with the operating-handle 40 and mounted in the lugs 41, carried by the nut-casing 42, threaded upon the upper end of the saw-carrier 32. The driving shaft or arbor 43 of the saw 22 is journaled within the screw 36 and held in any desired manner—for instance, by means of adjusting-nuts 44 at its lower end and the usual arrangement of clamping-nuts 45 at the upper portion thereof, where the saw is held. For the purpose of driving this saw various constructions may be used; but I have herein shown the shaft or arbor 43, which is provided with the angular recess 46 therein and adapted to fit a similarly-formed portion 47 of the driving-shaft 48, which is provided with a bevel-gear 49 at its lower end adapted to mesh with a similar gear 50, carried upon the shaft 51, disposed within the bearing 31 of the saw-carrier and having at its opposite end bevel-gear 52, meshing with a corresponding gear 53, splined upon the shaft 54, which is provided with a driving-pulley 55 of any desired character, to which power may be applied from any source. This splined connection permits the gear 53 to slide upon its shaft 54 in the adjustment of the carriage, and the carriage is provided with an arm 66, embracing the shaft 54 at one side of said gear, so as to retain it in meshing contact with its companion gear.

Various means may be used for adjusting the side saw toward and from the side of the platen, but that herein shown has been found desirable and comprises a threaded lug 56, Fig. 1, depending from the carriage 27 and adapted to receive the adjusting-screw 57, mounted in the base-plate 23. This screw is provided at its outer end with a driving-pinion 58, meshing with a coöperating pinion 59, carried by the vertically-disposed shaft 60, having at its opposite end a hand-wheel 61, mounted in a suitable standard 62, rising from the base 23.

In the operation of the invention it will be seen that a great variety of cuts or checks may be effected by the use of this invention, particularly when the side saw is used in connection with the vertically-disposed saw, as shown in Fig. 1. This vertical saw is capable of adjustment laterally of the platen and vertically toward and from the same, while the side saw is also capable of lateral adjustment toward and from the side of the platen and vertically relative thereto. The side saw is also capable of disposition in a plane extending diagonally to that of the platen, so as to provide a beveled or inclined surface upon the work cut, as shown by dotted lines in Fig. 5, while if a right angle is desired the saw may be retained in a horizontal plane, as shown by full lines in said figure. It will therefore be seen that by a proper adjustment of these two saws various forms of blocks or checks may be cut from a block of stone and that the mounting of the side saw is such as to permit its being driven in any of its adjusted positions, and adjustment can also be made while the saw is still rotating, as the adjusting means are independent of the driving connections. When the saw is adjusted in a curved path upon its bearing in the carriage, the driving-gears travel upon each other, while in a vertical adjustment of the side saw its arbor travels upon the angular portion of its driving-shaft. This invention therefore presents a very convenient, economically-constructed, and readily-controlled means for driving the horizontally-disposed side saw at one or both sides of the platen of any character of stone-dressing machinery to which it may be adapted.

Having now described my invention and set forth its merits, what I claim, and desire to secure by Letters Patent, is—

1. In a stone-sawing machine, a platen, a vertically-disposed saw above the platen, and a saw disposed upon the base of the platen at one side thereof to operate above said platen at an angle to the vertically-disposed saw.

2. In a stone-sawing machine, a platen, a vertically-disposed saw above the platen, a saw disposed upon the base of the platen at one side thereof to operate above said platen at an angle to the vertically-disposed saw, and means for adjusting said side saw vertically independently of the coöperating saw.

3. In a stone-sawing machine, a platen, a vertically-disposed saw above the platen, a saw disposed upon the base of the platen at one side thereof to operate above the platen at an angle to the vertically-disposed saw, means for adjusting said side saw vertically independently of the coöperating saw, and means for adjusting said vertically-disposed saw laterally of the platen.

4. In a stone-sawing machine, a platen, a vertically-disposed saw above the platen, a saw disposed upon the base of the platen at one side thereof to operate above the platen at an angle to the vertically-disposed saw, means for adjusting said side saw vertically independently of the coöperating saw, means for adjusting said vertically-disposed saw laterally of the platen, and means for adjusting the vertically-disposed saw in a vertical plane.

5. In a stone-sawing machine, a platen, a vertically-disposed saw above the platen, a saw disposed upon the base of the platen at one side thereof to operate above the platen at an angle to the vertically-disposed saw, means for adjusting said side saw vertically independently of the coöperating saw, means for adjusting said vertically-disposed saw laterally of the platen, means for adjusting the vertically-disposed saw in a vertical plane, and means for adjusting said side saw in a curved path laterally of the platen.

6. In a stone-sawing machine, a sliding platen, a vertically-disposed saw above the platen, and a saw disposed at one side of the platen to operate transversely to intersect the path of cut of the vertically-disposed saw.

7. In a stone-sawing machine, a sliding platen, a vertically-disposed saw above the platen, a saw disposed at one side of the platen to operate transversely to intersect the path of cut of the vertically-disposed saw, and means for adjusting said side saw obliquely to said path of cut.

8. In a stone-sawing machine, the combination with a platen, of a vertically-disposed saw above the same, a horizontally-disposed saw at one side of said platen, means for adjusting said saws toward and from each other to intersect transversely their respective paths of cut, and means for independently adjusting each of said saws in a vertical plane relative to the platen.

9. In a stone-sawing machine, the combination with a platen, of a vertically-disposed saw above the same, a horizontally-disposed saw at one side of said platen, means for adjusting said saws toward and from each other to intersect transversely their respective paths of cut, means for independently adjusting each of said saws in a vertical plane relative to the platen, and means for adjusting said side saw diagonally to the vertically-disposed saw.

10. In a stone-sawing machine, the combination of a reciprocating platen, of a vertically-disposed saw above the platen, a horizontally-disposed saw mounted upon the base at one side thereof, and means for adjusting said horizontally-disposed saw obliquely to and into the path of cut of the vertically-disposed saw.

11. In a stone-sawing machine, a sliding platen, a base-plate extended laterally from said platen, a horizontally-disposed carriage slidably mounted thereon, and a saw-carrier mounted upon said carriage and provided with a horizontally-disposed saw at its upper portion.

12. In a stone-sawing machine, a base-plate, a carriage slidably mounted thereon, a saw-carrier mounted upon said carriage and provided with a horizontally-disposed saw at its upper portion, a feeding-lug depending from said carriage, a feed-screw carried by the base-plate to engage said lug, a gear upon the outer end of said feed-screw, an adjusting-shaft provided with a meshing gear at its lower end, and an operating-handle disposed at the upper end of said adjusting-shaft.

13. In a stone-sawing machine, a carriage provided with a horizontally-disposed bearing at one side thereof, a saw-carrier mounted in said bearing for adjustment toward and from the carriage and in a curved path, and means for retaining said carrier in adjusted position.

14. In a stone-sawing machine, a carriage provided with a horizontally-disposed bearing at one side thereof, a saw-carrier mounted in said bearing for adjustment toward and from the carriage and in a curved path, a vertically-disposed plate provided with a segmental slot, a lug extending from said carrier, and securing-bolts extending through said lug and slot.

15. In a stone-sawing machine, a platen, a carriage disposed upon the base at one side of the platen and provided with a bearing, a saw-carrier mounted in said bearing to swing in a vertical plane at one side of said platen, a driving-shaft extended through the bearing portion of said carrier, and a saw-driving shaft disposed in the vertical portion of said carrier.

16. In a stone-sawing machine, a carriage provided with a horizontally-disposed bearing, a saw-carrier having its axis journaled in said bearing, a driving-shaft extended through said axis and provided with gears at its opposite ends, a driving-shaft disposed in the vertical portion of said carrier, a saw connected to said driving-shaft, and means for adjusting said saw vertically upon its driving-shaft.

17. In a stone-sawing machine, a carriage provided with a horizontally-disposed bearing, a saw-carrier having its axis journaled in said bearing, a driving-shaft extended through said axis and provided with gears at its opposite ends, a driving-shaft disposed in the vertical portion of said carrier, a saw connected to said driving-shaft, a bearing-screw surrounding the arbor of said saw, a worm-nut carried by the upper portion of said saw-carrier and threaded upon said screw, and a worm for operating said nut.

18. In a stone-sawing machine, a saw-carrier provided with a driving-shaft having an angular portion, a saw provided with an arbor having an angular recess to fit said portion, an adjusting-screw journaled upon said arbor, a worm-nut threaded upon said screw, a casing carried by the upper portion of the saw-carrier and surrounding said nut, and an operating-worm pivotally mounted in said casing.

19. In a stone-sawing machine, a base-plate provided with a track or way, a carriage mounted thereon, a saw-carrier upon said carriage, a driving-shaft for said carrier having a bevel-gear upon its outer end, a power-shaft supported by the base-plate parallel with said track and provided with a driving-pulley, and a meshing gear splined upon said power-shaft to travel thereon in the adjustment of said carriage.

20. In a stone-sawing machine, a base-plate, a carriage mounted to travel thereon and provided with an elongated bearing extending transversely of the carriage, a saw-carrier having its shaft journaled in said bearing, a rib or flange extending longitudinally of the carriage and provided with a segmental slot therein, and means carried by the carrier for clamping it in contact with said rib or flange.

21. In a stone-sawing machine, a platen, a carriage mounted at the base on one side thereof to travel laterally toward and from the side of the platen, and a saw-carrier pivotally mounted upon the carriage to swing transversely to the travel of the platen.

22. In a stone-sawing machine, a platen, a carriage mounted at the base on one side thereof to travel laterally toward and from the side of the platen, a saw-carrier pivotally mounted upon the carriage to swing transversely to the travel of the platen, and means to vertically adjust the saw upon said carrier.

23. The combination with the traveling platen of a stone-dressing machine, of a vertically-disposed saw above the platen, a base-plate disposed at one side of the platen, and a horizontally-disposed saw carried upon said plate and provided with means for adjustment in both vertical and horizontal planes independently of the vertical saw and to intersect the path of cut thereof.

24. The combination with the traveling platen of a stone-dressing machine, of a vertically-disposed saw above the platen, a base-plate disposed at one side of the platen, a horizontally-disposed saw carried upon said plate and provided with means for adjustment in both vertical and horizontal planes independently of the vertical saw and to intersect the path of cut thereof, and means for swinging said horizontal saw in a curved path toward and from the side of said platen.

In testimony whereof I affix my signature in presence of two witnesses.

EDSON T. POLLARD.

Witnesses:
T. J. LOUDEN,
MORTON T. HUNTER.